United States Patent [19]

Tasaki et al.

[11] 4,122,990
[45] Oct. 31, 1978

[54] PORTABLE FRICTIONAL WELDING DEVICE

[75] Inventors: Yoshio Tasaki; Noboru Nakayama, both of Nagoya; Hiroshi Kajihara, Kohnan, all of Japan

[73] Assignee: Agency of Industrial Science & Technology, Tokyo, Japan

[21] Appl. No.: 748,880

[22] Filed: Dec. 9, 1976

[30] Foreign Application Priority Data

Dec. 11, 1975 [JP] Japan .................. 50-148237

[51] Int. Cl.² .......................................... B23K 19/02
[52] U.S. Cl. ...................................... 228/2; 408/76
[58] Field of Search ................. 228/2; 408/76, 137

[56] References Cited

U.S. PATENT DOCUMENTS

| 1,396,885 | 11/1921 | Sanchez | 408/76 X |
| 1,946,214 | 2/1934 | Kabigting | 408/76 |
| 3,616,980 | 11/1971 | Padilla | 228/2 |
| 3,640,147 | 2/1972 | Fantoni | 408/137 |
| 3,788,760 | 1/1974 | Daniels | 408/137 X |
| 3,885,635 | 5/1975 | Menzel | 408/137 X |
| 3,972,465 | 8/1976 | Takaoka et al. | 228/2 X |

Primary Examiner—Al Lawrence Smith
Assistant Examiner—K. J. Ramsey
Attorney, Agent, or Firm—Oblon, Fisher, Spivak, McClelland & Maier

[57] ABSTRACT

Disclosed herein is a portable frictional welding device whereby union of a metallic part with a given structure is accomplished by fastening said metallic part to the rotary shaft of the device supported slidably in the axial direction thereof, operating the rotary shaft so as to rotate the metallic part and at the same time pressing it against the structure and, when the point therebetween has assumed a state of fusion, stopping the rotation of the rotary shaft and simultaneously increasing the thrust being applied to said structure.

9 Claims, 2 Drawing Figures

PORTABLE FRICTIONAL WELDING DEVICE

BACKGROUND OF THE INVENTION

This invention relates to a portable frictional welding device.

Frictional welding is a welding process whereby metallic parts subjected to welding are united by positively rotating and propelling one of said parts against the other one or both of said parts against each other with a fixed magnitude of thrust, discontinuing said rotation at the time that the frictional heat generated at the point of contact has risen to a prescribed level and thereafter increasing the thrust with which the two parts are held against each other.

To date, such frictional welding has been employed for uniting automobile parts, tools, etc. Structurally, most frictional welding devices are very large and are designed for stationary installation in plants. For this reason, such frictional welding devices have not heretofore been usable in uniting metallic parts onto an existing or incomplete structure such as, for example, the steel frame in a steel-frame structure and the hull of a ship.

An object of the present invention is to provide a portable frictional welding device which enables metallic parts to be easily united by frictional welding onto structures, ships and other similar stationary and difficult-to-move articles.

SUMMARY OF THE INVENTION

To attain the object described above, the portable frictional welding device according to the present invention comprises a rotary shaft provided with a member for grasping a metallic part to be attached by welding at the lower portion thereof, a first rotation-driving member for rotating said rotary shaft, a bearing member for slidably supporting said rotary shaft in the axial direction of said rotary shaft, a direction-changing member connected with said bearing member for changing the rotating motion of said rotary shaft into a vertical motion, and a second rotation-driving member connected with said direction-changing member for sliding said bearing member in the axial direction of said rotary shaft.

The portable frictional welding device according to the present invention provides an apparatus for easily welding a metallic part with a given structure by pressing the metallic part against the structure while rotating the metallic part, stopping the rotation of the metallic part when the point between the metallic part and the structure has assumed a state of fusion and increasing the thrust being applied to the structure. The present device has a simple structure and is easy to transport, and therefore the welding can be carried out with the device located in the most convenient position.

Other objects and other characteristic features of the present invention will become apparent from a more specific description to be given hereinafter with reference to the accompanying drawings.

DETAILED DESCRIPTION OF THE PREFERRED EMBODIMENT

Figure 1:
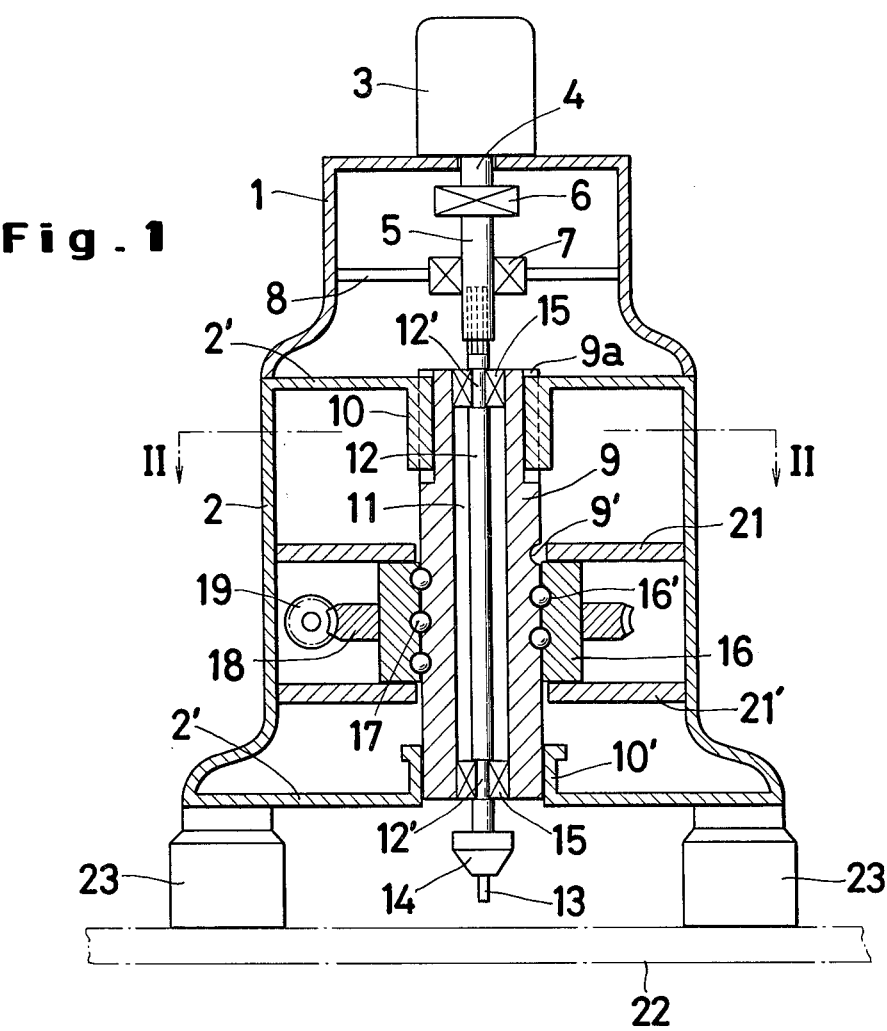
FIG. 1 is a sectional view of a portable frictional welding device according to the present invention.

With reference to FIG. 1, a drive motor 3 is mounted on an upper casing 1, a rotary shaft 4 of said drive motor 3 passes through the center of the upper casing 1 and protrudes inwardly to be connected with a drive shaft 5 through the medium of an electromagnetic clutch 6 and said drive shaft 5 is provided with a brake 7 which serves to arrest the rotation of said shaft and is supported in position by arms 8 extending inwardly from said upper casing 1.

Figure 2:
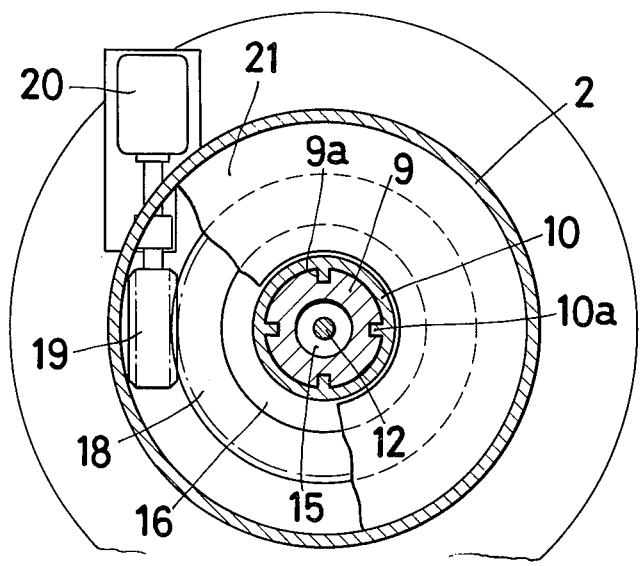
FIG. 2 is a sectional view taken along the line II—II in FIG. 1.

At the center of a lower casing 2 which is fitted to said upper casing 1, there is a cylindrical member 9 disposed coaxially with said drive shaft 5. The outer surface of said cylindrical member 9 is provided with a spiral groove 9'. An upper portion of said cylindrical member 9 is provided with a plurality of vertically disposed ridges 9a as shown in FIG. 2. The internal surface of a bearing 10 fastened to an upper cover plate 2' of said lower casing 2 is provided with a plurality of vertical grooves 10a. The upper portion of said cylindrical member 9 is supported in position by the fast engagement of said ridges 9a with the corresponding 10a in the bearing 10. At the same time, the lower portion of said cylindrical member 9 is supported in position on a bearing 10' which is fastened to the lower cover plate 2' of the lower casing 2. Alternatively, the lower portion of the cylindrical member 9 may be supported in position in the same manner as the upper portion thereof. Consequently, the cylindrical member 9 is supported by the bearings 10 and 10' so that it can be slidably moved only in the axial direction. An inner bore 11 of the cylindrical member 9 is pierced by a rotary shaft 12 which protrudes upwardly and downwardly beyond either end of the cylindrical member 9. The upper end of said rotary shaft 12 is connected with the drive shaft 5 through the medium of a spline or key, for example, so as to be movable in the axial direction. At the same time, the lower end of the rotary shaft 12 is provided with a chunk 14 adapted to grasp a metallic part 13 to be subjected to welding. Constrictions 12' are formed in said rotary shaft 12 one each at an upper and a lower portion of the cylindrical member 9. Because of bearings 15 which are fitted into said constrictions 12' and fastened onto the inner wall at the upper and lower portions of said cylindrical member 9, the rotary shaft 12 is supported freely rotatably in position. As a result, the rotary shaft 12 is moved vertically in association with the vertical motion of the cylindrical member 9.

To the portion of said cylindrical member 9 having said spiral groove 9' formed on its outer surface, there is fitted a sleeve 16 having a matching spiral groove 16' formed on its inner surface. A multiplicity of balls 17 are inserted to fill the spiral path of a circular cross section which is formed jointly by said matched spiral grooves 9' and 16'. The said sleeve 16 is prevented from moving vertically by a disk 21 and a disk 21' which are fastened to the lower casing 2 and held tightly against the upper and lower ends of sleeve 16 respectively. To the outer surface of said sleeve 16, there is fastened a worm wheel 18 which is meshed with a worm 19 adapted to be driven by a torque motor 20 fastened to a lateral portion of the lower casing 2. Thus, a rotation of the worm 19 causes the cylindrical member 9 alone to be moved vertically by virtue of said balls 17. Further on the bottom surface of the lower casing 2, there is provided fixing member 23 such as an electromagnet capable of thoroughly fixing the welding device with respect to a structure 22 to which a metallic part is to be welded.

The present invention aims to provide a frictional welding device of a construction as described above. Now, the operation of this device will be described.

The frictional welding device of this invention is formed compactly as described above. Because of the compact construction, where a metallic part 13 is to be joined by frictional welding to a part of an immovable structure 22 such as the steel frame of a steel-frame structure or the hull of a ship, for example, the device of this invention is transported to the point of welding. By means of said fixing member 23, the device is directly fastened onto the structure 22 to which the metallic part is to be united. Where the device thus fastened to the structure is unsteady, use of metallic splite plates or some other similar structure may be used to secure it in position more positively. Then, a metallic part 13 to be welded is held fast by the chuck 14 of said rotary shaft 12.

After the device and the metallic part have been set in position as described above, the motor 3 is started to impart a rotary motion to the rotary shaft 12 through the medium of the drive shaft 4, the electromagnetic clutch 6 and the drive shaft 5, with the result that the metallic part 13 is rotated at a prescribed number of rotations. When the torque motor 20 is rotated in its positive direction, the worm 19 sets the worm wheel 18 turning and consequently causes the sleeve 16 which is integrally fixed with said worm wheel 18 to rotate simultaneously. In proportion to the rotation of the sleeve 10, the cylindrical member 9 is slowly lowered by virtue of the multiplicity of balls 17 held along the spiral groove on the inner surface of the sleeve 10. Simultaneously with the descent of said cylindrical member 9, said rotary shaft 12 supported in position by the cylindrical member 9 is lowered, causing the metallic part 13 held fast by the chuck 14 to be rotated at a prescribed rate and thrust against the structure 22. In other words, the rotation given by the motor 3 and the thrust imparted by the torque motor 20 cooperate to bring the metallic part into frictional contact with the structure 22.

The rotational contact between the structure and the metallic part generates frictional heat and this frictional heat eventually brings the joint between them to the state of fusion required for frictional welding. The fact that the joint of frictional rotation has assumed said state of fusion can be detected by using as the criterion the predetermined amount of movement of the metallic part between the time said part comes into frictional contact and the time it assumes said state of fusion or the predetermined duraction between said two time points. When the conditions for assuming that said state of fusion has been reached are met, a command is issued to separate the electromagnetic clutch 6 and actuate the brake 7 and, at the same time, another command is issued to increase the magnitude of torque on the torque motor 20. Consequently, the drive shaft 4 of the motor 3 is separated from the drive shaft 5 and brakes are applied to the drive shaft 5 to arrest the rotation of the rotary shaft 12 and that of the metallic part 13. In the meantime, since the torque of the torque motor 20 is increased, the metallic part 13 is thrust against the structure with a force greater than the force with which is was held in said frictional contact. Thus, the metallic part 13 is united with said structure 22. After the metallic part 13 and the structure 22 have been united as described above, the chuck 14 is opened to release the metallic part 13 and, at the same time, the torque motor is set to rotate in the reverse direction to cause the sleeve 16 and the rotary shaft 12 to return to their original position.

The device of this preferred embodiment enables a metallic part 13 to be united with a structure 22 by frictional welding as described above. It, therefore, can be utilized in applications involving union of metallic parts to steel-frame structures and ships and to many other articles in various fields as well. The thrust required for the purpose of frictional welding can easily be obtained by suitably controlling the electric potential applied to the torque motor 20 with due consideration to the welding conditions such as the material and dimensions of the particular metallic part 13 being welded.

The preferred embodiment has been described as utilizing an interlocking mechanism wherein the torque motor 20 serves as a mechanism for producing a rotational force and the train of balls held in the spiral path serve as means for changing the direction of motion so as to convert said rotational force into a thrust required for forcing the metallic part 13 against the structure 22. Other means can likewise be used to attain the object of this invention: for example, a variable-speed motor, a servo-motor, etc. can be used as a mechanism for producing the rotational force, while ordinary screws, a link mechanism, a cam, etc. can be used as a mechanism for changing the direction of motion.

As described in detail above, the present invention has succeeded in meeting the primary purpose of simplifying the construction and reducing the weight of the frictional welding system for thereby enabling metallic parts to be joined by frictional welding to immovable structures by providing a portable frictional welding device wherein a rotary shaft adapted to keep hold of said metallic part and rotate simultaneously therewith and a drive motor adapted to impart necessary thrust to the metallic part are interlocked to each other through the medium of a mechanism such as a train of balls or screws which functions to convert a rotational motion into a linear motion. Because of its portability, the portable frictional welding device of the present invention can be used at construction sites, ship yards and the like as well as in manufacturing plants in general, for it can readily be transported to the very spot of welding and operated there to provide required frictional welding of metallic parts to immovable structures.

What is claimed is:

1. A portable frictional welding device for welding an object which comprises:
   a casing;
   a rotary shaft disposed within said casing;
   means provided at the lower portion of said rotary shaft for grasping a metallic part to be subjected to welding;
   a motor for rotating said rotary shaft;
   a slidable cylindrical member provided with a spiral groove on the outer surface thereof for freely rotatably supporting said rotary shaft in the axial direction of said rotary shaft;
   a sleeve provided with a matching spiral groove on the inner surface thereof and with a worm wheel on the outer surface thereof, and fitted to said cylindrical member to form a spiral path by the matched spiral grooves in which path a plurality of balls are inserted;

a torque motor for rotating said worm wheel for thereby sliding said cylindrical member in the axial direction of said rotary shaft; and, fixing means provided on the bottom surface of said casing for positionally fixing said device with respect to the object to which said metallic part is to be welded.

2. The portable frictional welding device according to claim 1, wherein said fixing means are electromagnets.

3. The portable frictional welding device according to claim 1, wherein said rotation-driving motor is connected to said rotary shaft via a clutch means and which further comprises brake means connected to said rotary shaft for arresting rotation of said rotary shaft and said metallic part simultaneously with separation of said clutch from engagement with said shaft in response to a predetermined state of fusion of frictional welding between the object and said metallic part.

4. The portable frictional welding device according to claim 1, wherein said rotary shaft has a spline mechanism for connecting said rotary shaft to said motor for rotating said rotary shaft.

5. The portable frictional welding device according to claim 1 which further comprises means for preventing movement of said sleeve.

6. The portable frictional welding device according to claim 5, wherein said means for preventing movement of said sleeve comprises first and second disk members held, respectively, against upper and lower ends of said sleeve to prevent vertical movement of said sleeve.

7. The portable frictional welding device according to claim 1, wherein an upper portion of said cylindrical member includes a plurality of vertically disposed ridges and wherein said portable frictional welding device further comprises bearing means with vertical grooves provided therein such that said vertically disposed ridges engage with said vertical grooves.

8. The portable frictional welding device according to claim 1, wherein an lower portion of said cylindrical member includes a plurality of vertically disposed ridges and wherein said portable frictional welding device further comprises bearing means with vertical grooves provided therein such that said vertically disposed ridges engage with said vertical grooves.

9. The portable frictional welding device engaging to claim 1, wherein an upper and lower portion of said cylindrical member includes a plurality of vertically disposed ridges and wherein said portable frictional welding device further comprises first and second bearing means with vertical grooves provided therein such that said vertically disposed ridges of said upper and lower portions of said cylindrical member engage with said vertical grooves of said first and second bearing means, respectively.

* * * * *